A. H. CANDEE.
CONTROL SYSTEM.
APPLICATION FILED MAY 2, 1917.

1,358,704.

Patented Nov. 16, 1920.
2 SHEETS—SHEET 1.

SLIP SEGMENT
ON CONTROLLER

WITNESSES:
Fred. C. Wilharm
Wayne B. Wells

INVENTOR
Andrew H. Candee
BY
ATTORNEY

A. H. CANDEE.
CONTROL SYSTEM.
APPLICATION FILED MAY 2, 1917.

1,358,704.

Patented Nov. 16, 1920.
2 SHEETS—SHEET 2.

WITNESSES:
Fred. C. Kilharm
Wayne B. Wells.

INVENTOR
Andrew H. Candee
BY
Wesley G. Carr
ATTORNEY

UNITED STATES PATENT OFFICE.

ANDREW H. CANDEE, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,358,704. Specification of Letters Patent. Patented Nov. 16, 1920.

Application filed May 2, 1917. Serial No. 165,856.

*To all whom it may concern:*

Be it known that I, ANDREW H. CANDEE, a citizen of the United States, and a resident of Pittsburgh, in the county of Allegheny and State of Pennsylvania, have invented a new and useful Improvement in Control Systems, of which the following is a specification.

My invention relates to control systems and particularly to control systems for electric railway vehicles.

One object of my invention is to provide a control system having means for restraining the operation of a motor-governing controller under predetermined conditions.

Another object of my invention is to provide a control system of the above indicated character which shall be provided with a brake for restraining the movement of the motor-governing controller when the current flowing through the governed motor or motors is above a predetermined value.

Another object of my invention is to provide a control system of the above indicated character which shall be provided with a brake-magnet for restraining the movement of the motor-governing controller, a limit switch for operating the brake in accordance with the current flowing through the motors and means for preventing the operation of the brake magnet when the controller is moved in a reverse direction.

In control systems, it is desirable to accelerate the motors contained therein in a steady and uniform manner in order to prevent injury to the motors by an excessive current flow therethrough.

The usual manner of preventing a too rapid acceleration of the motors and an excessive current flow therethrough is to provide a current-limit switch to govern the operation of the auxiliary control circuits. However, in a control system constructed in accordance with my invention, a current-limit switch is provided for governing the operation of the motor-governing controller in accordance with the current flowing through the motors.

Figure 1:
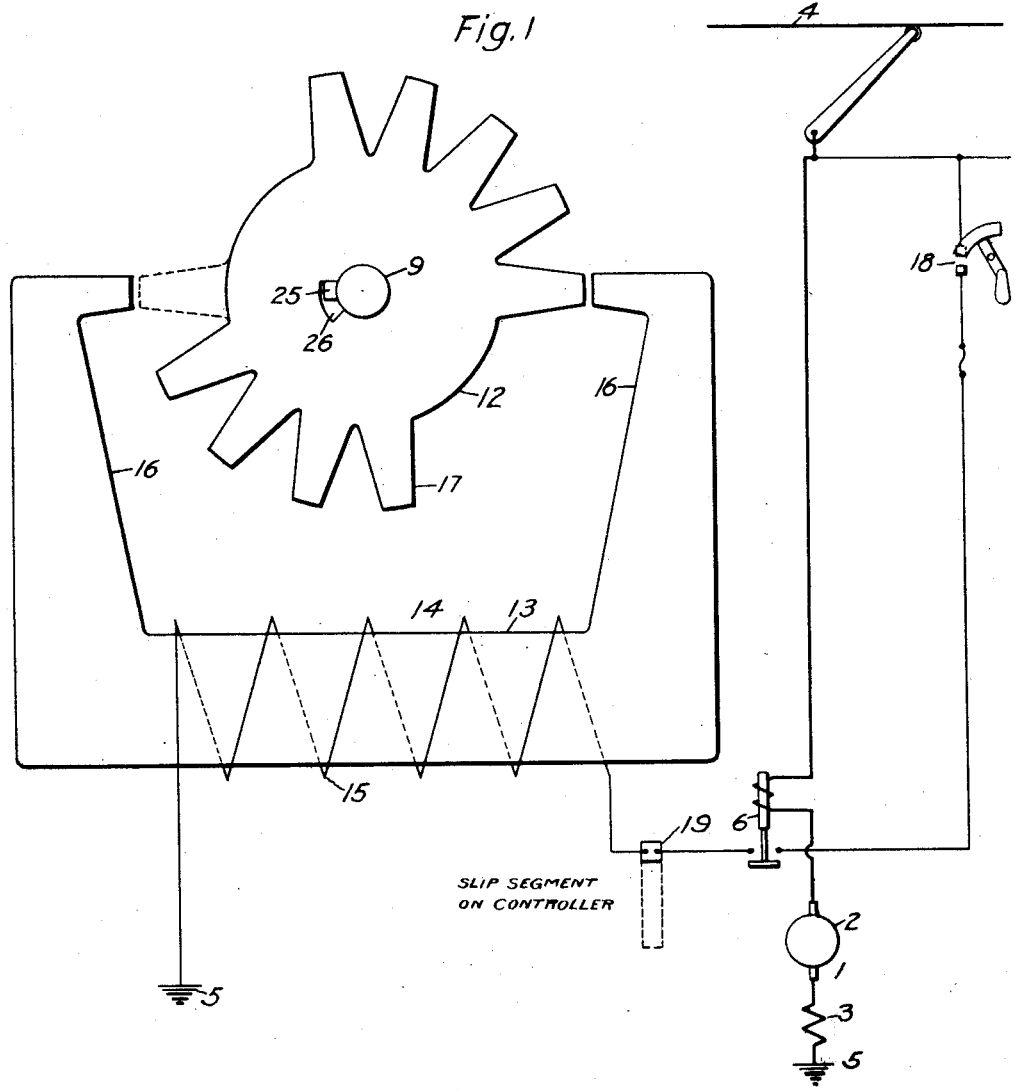
Figure 3:
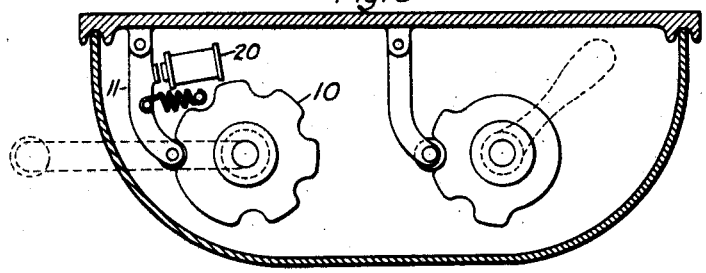
Figure 2:
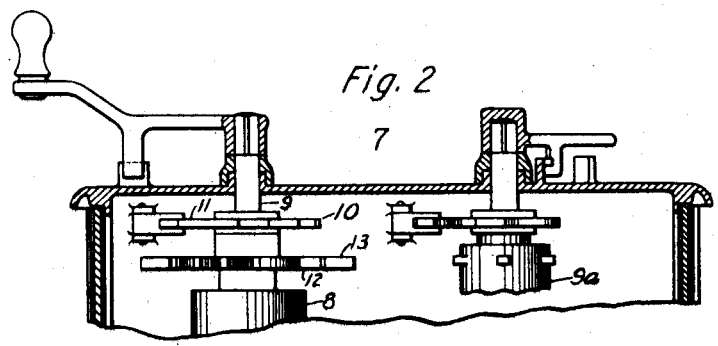
Figure 4:
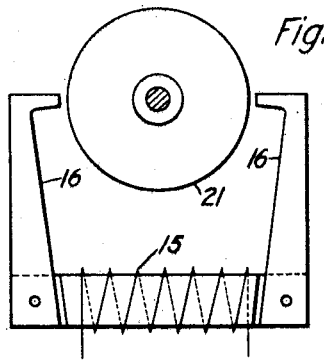

In the accompanying drawings, Figure 1 is a diagrammatic view of a controller constructed in accordance with my invention; Fig. 2 is a longitudinal sectional view of a portion of a controller constructed in accordance with my invention; and Figs. 3 and 4 are partially sectional and partially plan views of portions of controllers provided with modifications of my invention.

Referring to Figs. 1 and 2 of the drawings, a motor 1, comprising an armature 2 and a field winding 3, is connected across a supply circuit comprising a trolley conductor 4 and a ground-return conductor 5. The coil of a current-limit switch 6 is included in the circuit of the motor 1 for a purpose to be hereinafter described.

A controller 7, embodying a main drum 8 and a reversing drum 9ᵃ, is provided for governing the acceleration of the motor 1, in a usual and familiar manner, further illustration and description of the means for effecting acceleration of the motor being deemed unnecessary. On the shaft 9 of the main drum 8 is mounted a star wheel 10 which coöperates with a pawl 11 for accentuating the various positions of the controller. A toothed magnetizable disk 12 is also mounted on the shaft 9 to coöperate with a yoke 13 of an electromagnet 14 for restraining the movement of the controller. The yoke 13, which is provided with a coil 15, has arms 16 the free ends of which are disposed adjacent to teeth 17 of the disk 12 for a purpose to be hereinafter described. The coil 15 of the electromagnet 14 is connected across the supply conductors 4 and 5 through a manually operable switch 18, the current-limit switch 6 and a slip segment 19 which is associated with the controller 7. The slip segment 19 may be of a character such as is disclosed in the patent to N. W. Storer, No. 1,239,840, issued September 11, 1917, and assigned to the Westinghouse Electric & Manufacturing Co.

The magnetizable disk 12 is caused to rotate with the shaft 9 by means of a pin 25 which projects from the shaft into a slot 26 in the disk. The slot 26 is somewhat larger than the diameter of the pin 25 in order to permit a small movement of rotation of the shaft 9 before the disk is actuated. Thus, when the controller is reversed, the slip segment 19 will be operated to break the circuit of the coil 15 before the disk 12 is actuated by the shaft 9.

When the controller 7 is moved in a forward direction, the teeth 17 of the magnetizable disk are successively disposed in alinement with the free ends of the arms 16 of the yoke 13 and, if the controller is moved at too rapid a rate, sufficient current will flow through the motor circuit to cause the current-limit switch 6 to close. When the current-limit switch 6 is closed, the coil 15 of the electromagnet 14 is energized by current flowing therethrough from the trolley conductor to the ground-return conductor 5. When the coil 15 is energized, a magnetic circuit is completed which includes the arms 16 of the yoke 13 and the magnetizable disk 12, and, while this circuit is maintained, the controller 7 is restrained from further movement until the current-limit switch 6 is opened or the controller is moved in a reverse direction to break the circuit through the coil 15 by means of the slip segment 19.

It should be noted, however, that the electromagnet 14 does not lock the controller 7 but merely restrains the same from movement, and in case of emergency the controller may be advanced in opposition to the electromagnet 14. The manually operated switch 18 is provided for breaking the circuit of the coil 15 when the operation of the magnetic brake is not desired. The slip segment 19 is essential in order to prevent the operation of the magnetic brake when the controller has been operated and is being returned to the initial position.

In the modification illustrated in Fig. 3 of the drawing, the magnetic brake comprises an electromagnet 20, the pawl 11 and the star wheel 10. The energizing circuit for the coil of the electromagnet 20 is similar to the circuit illustrated in Fig. 1 for the coil 15 of the electromagnet 14. Thus, in case an excessive current flows through the motor 1, the electromagnet 20 will be energized to hold the pawl 11 against the star wheel 10 and restrain the controller drum 8 against further movement until the current-limit switch 6 breaks the energizing circuit of the electromagnet.

In the modification illustrated in Fig. 4 of the drawing, the toothed disk of Figs. 1 and 2 is replaced by a solid disk 21, and the arms 16 of the yoke 13 are pivoted so that the same may be drawn into contact with the disk whenever the coil 15 is energized.

Modifications in the system and arrangement and location of parts may be made within the spirit and scope of my invention and such modifications are intended to be covered by the appended claims.

I claim as my invention:

1. In a system of control, the combination with a motor and a controller for governing the operation of the motor, of a brake associated with said controller and having a winding governed in accordance with the current flowing through said motor when the controller is moved in a forward direction, and means for interrupting the current in said winding to prevent the operation of said brake when the controller is moved in a reverse direction.

2. In a system of control, the combination with a motor, and a drum controller for governing the operation of said motor, of a magnet brake comprising a toothed disk mounted on the controller drum and an electromagnet associated with said disk, and means for governing the energization of said magnet in accordance with the current flowing through said motor to restrain the operation of the controller when the motor current is above a predetermined value.

3. In a system of control, the combination with a motor, and a drum controller for governing the operation of said motor, of a magnet brake comprising a toothed disk mounted on the controller drum and an electromagnet associated with said disk, and means comprising a limit switch for governing the energization of said magnet in accordance with the current flowing through said motor to restrain the operation of the controller when the motor current is above a predetermined value.

4. The combination with a translating device and a movable switching element for governing the operation thereof, of a magnetic brake having one member mechanically associated with said switching element and provided with a plurality of position-determining teeth.

5. The combination with a motor and a rotatable control element for governing the operation thereof, of a magnetic brake having one member movable with said control element and provided with a plurality of position-determining teeth, said brake also comprising a stationary member coöperating with said teeth and magnetized in accordance with the current traversing said motor.

6. The combination with a motor and a rotatable control element for governing the operation thereof, of a magnetic brake having one member mounted on said element and provided with a plurality of position-determining teeth, said brake also comprising a stationary yoke having arms coöperating with said teeth, a coil for said yoke connected in shunt relation to said motor, and a lost-motion connection for said brake member whereby the circuit of said coil is broken before the member is turned, upon a backward movement of the control element.

In testimony whereof, I have hereunto subscribed my name this 27th day of April, 1917.

ANDREW H. CANDEE.